Dec. 21, 1926. 1,611,448
J. HORTVET
MILK FAT CALIPER
Filed Feb. 24, 1925 2 Sheets-Sheet 1
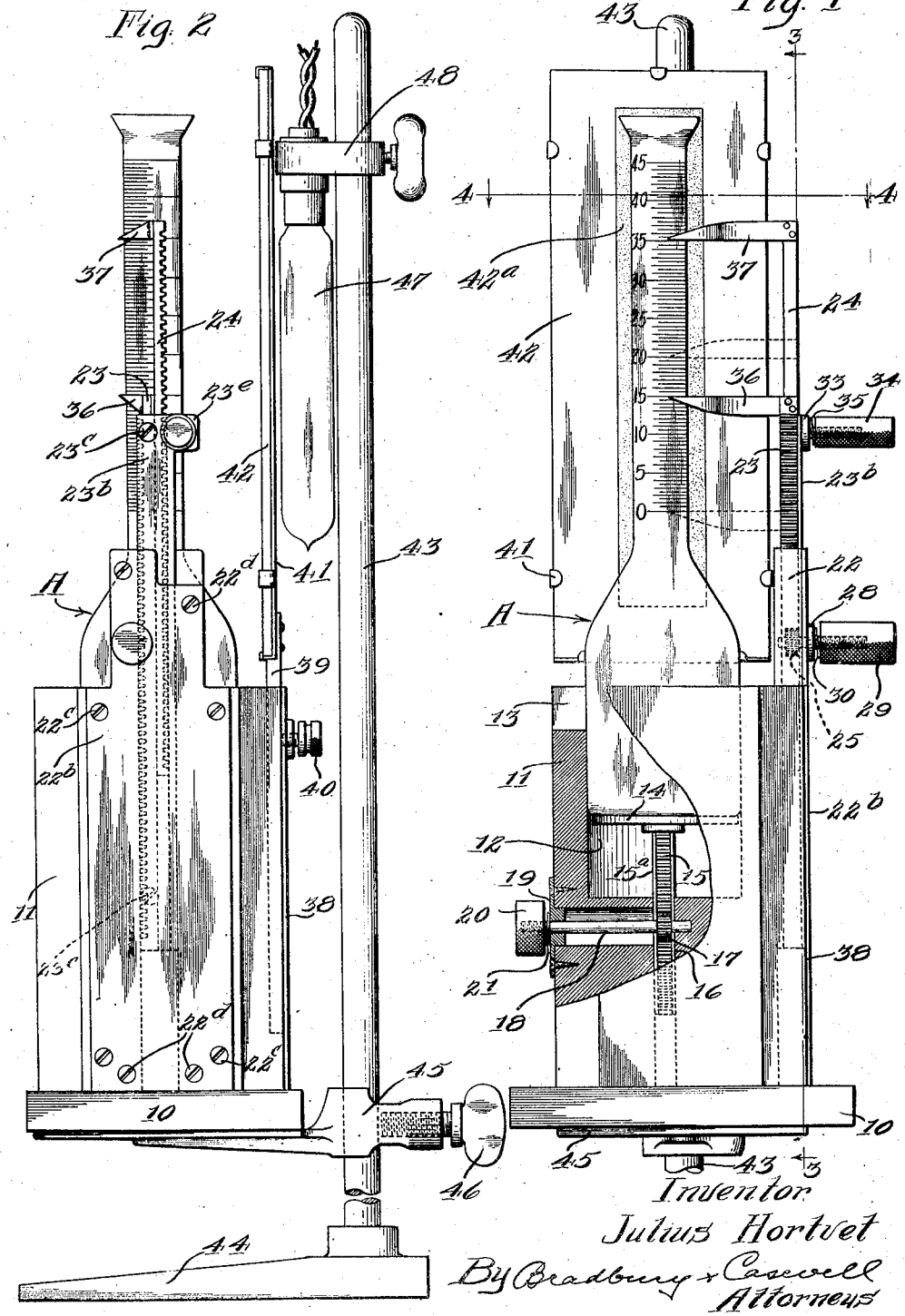
Inventor
Julius Hortvet
By Bradbury & Caswell
Attorneys Dec. 21, 1926.　　　　　　　　　　　　　　　　1,611,448
J. HORTVET
MILK FAT CALIPER
Filed Feb. 24, 1925　　　　2 Sheets-Sheet 2
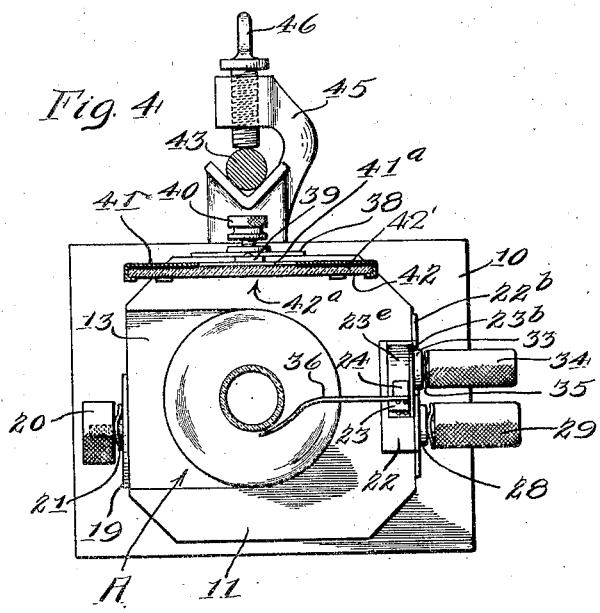
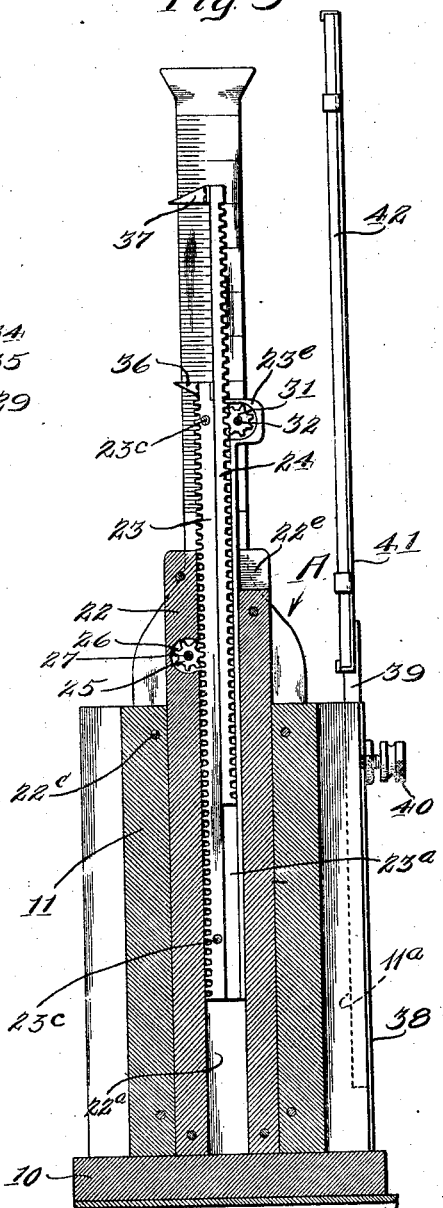
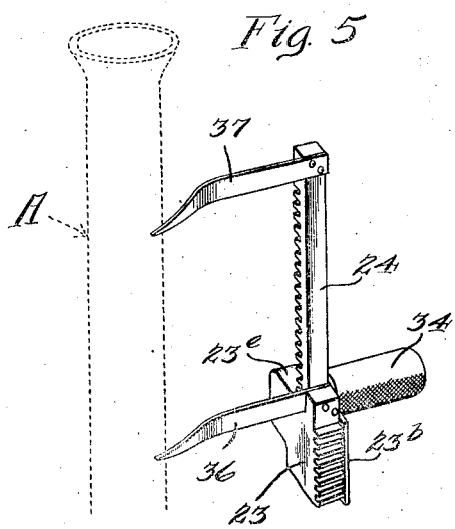
Inventor
Julius Hortvet
By Bradbury + Caswell
Attorneys Patented Dec. 21, 1926.

1,611,448

UNITED STATES PATENT OFFICE.

JULIUS HORTVET, OF MINNEAPOLIS, MINNESOTA.

MILK-FAT CALIPER.

Application filed February 24, 1925. Serial No. 11,065.

My invention relates to improvements in calipers for measuring the fat column formed in the neck of a test-bottle, as in the Babcock method, and thereafter resolving the measurement in terms of percentage of fat with reference to the scale on the neck of the bottle, wherein measurement of the fat column is taken.

An object of the invention is to provide a simple, durable and accurate instrument of the present nature by which the measurements of fat columns and calculations in terms of fat percentages may be quickly and easily made.

A further object is to supply an instrument, as above, embodying an efficient mechanical arrangement of parts and equipped with means for insuring proper sighting levels, whereby precision may be attained in the test readings.

With the foregoing and other objects in view, which will appear in the following description, the invention resides in the novel combination and arrangement of parts and in the details of construction hereinafter described and claimed.

In the accompanying drawings, Fig. 1 is a front elevationel view of an instrument embodying my invention; Fig. 2 is a side view thereof; Fig. 3 is a vertical sectional view taken on the line 3—3 of Fig. 1; Fig. 4 is a horizontal sectional view taken on the line 4—4 of Fig. 1 and Fig. 5 is a detail perspective view illustrating the two pointers and upper portions of the racks carrying the same.

Referring to the drawings, it will be observed that the illustrated embodiment of my invention includes a base 10 and a block or body 11 planted on end on said base. The upper end of the block has a socket 12 formed therein to receive the bulb of a test-bottle A. A notch 13 formed at the left side of said block 11, in the upper edge thereof, is provided to receive the bottom of a test-bottle and guide the same into the socket 12. A disc-like bottle rest 14 in the socket 12 is supported by the upper end of a rack 15 slidable up and down in a vertical guideway 16 formed in said block. A gear 17, meshing with said rack 15, is fixed to a shaft 18, which is journaled at its inner end in the block 11 and, near its outer end, in a plate 19 secured to the left side of the block 11. A knob 20 is secured to the outer end of the shaft 18 and encircling said shaft, between the knob 20 and the plate 19, is a spring washer 21. The action of this spring washer 21 draws one face of the gear 17 against a rib 15ª overreaching the teeth of the rack 15 with the result that the bottle rest 14 remains fixed unless the knob 20 is turned to elevate or depress said rest through the action of the gear 17 and rack 15. Recessed in the right side of the block 11 is an upright frame 22 having a vertical, central channel 22ª therein, opening outward therefrom. Mounted to slide up and down in the channel 22ª is a rack-bar 23, the same being toothed at its forward edge. This rack-bar 23 has a channel 23ª (Fig. 3) cut lengthwise thereof in its outer face, a rack 24, toothed at its rear edge, being slidable up and down in said channel 23ª. A cover-plate 23ᵇ, secured by screws 23ᶜ to the outer face of the rack-bar 23 confines the rack 24 in the channel 23ª in said rack-bar. A second cover-plate 22ᵇ secured by screws 22ᶜ to the block 11 and by screws 22ᵈ to the frame 22 confines the rack-bar 23 in the channel 22ª of said frame. A gear 25, housed within a recess 26 in the frame 22, co-acts with the teeth of the rack-bar 23, the meshing teeth of said gear 25 being overreached by the forward marginal portion of the cover-plate 23ᵇ. A shaft 27, to the inner end of which said gear 25 is secured, passes through a bearing 28 in the cover-plate 22ᵇ, the outer end of said shaft being fitted with a knob 29 fixed thereto. The turning of this knob 29 in one direction elevates the rack-bar 23, while the reverse rotation of said knob depresses said rack-bar. Encircling the shaft 27 between the knob 29 and the outer face of the bearing 28 is a spring washer 30. This washer 30, pressing against the knob 29 and bearing 28, frictionally engages one side of the gear 25 with said marginal portion of the cover-plate 23ᵇ and results in holding the rack-bar 23 in the various positions thereof attained through the manipulation of the knob 29. The rack-bar 23 is formed with a gear housing 23ᵉ communicating with the channel 23ª therein and opening outward in the direction of said channel. This housing 23ᵉ, in the lowermost position of the rack-bar 23, seats in a notch 22ᵉ in the upper end of the frame 22. Said housing contains a gear 31 meshing with the rack 24 and, like the channel 23ª in the rack-bar 23, is closed at its outer side by the cover-plate 23ᵇ. A shaft 32 journaled in a bearing 33 on the cover-plate 23ᵇ carries said gear 31 at its inner end, the outer end of said shaft having a knob 34 fastened thereto. The turning of the knob 34 in one direction lifts the rack 24 and the reverse rotation of said knob lowers said rack. Encircling the shaft 32 and bearing against the knob 34 at one side and the bearing 33 at the other is a spring washer 35, which acts to frictionally engage the outer side of the gear 31 with the cover-plate 23$^b$. The frictional contact of said gear 31 with said plate 23$^b$ holds the gear 31 against turning, except through the knob 34, and thereby holds the rack 24 in selected adjusted positions on the rack-bar 23. A pointer 36 having an upper horizontal sighting edge is carried by the rack-bar 23 and a pointer 37 having a lower horizontal sighting edge is carried by the rack 24. These pointers extend inwardly of the structure, the tips being offset forwardly of the shanks thereof to clear the neck of a test-bottle A (Fig. 4) seated on the rest 14 in the block 11.

The block 11 has a deep socket at the rear thereof formed by a vertical channel 11$^a$ in said block and an upright plate 38 covering said channel. A post 39 rising from said socket is held in vertically adjusted positions by means of a set screw 40 threaded in the plate 38 and bearing against said post 39. A holder 41, carrying a glass plate 42, rises from the post 39, said holder having an upright elongated opening 41$^a$ therein. A central panel 42$^a$ in the glass plate 42 registers with the opening 41$^a$ in the holder 41, the rear side of the panel being etched, frosted or otherwise treated, to render said panel translucent. The back of the remainder of said glass plate 42 is silvered as at 42' to provide an opaque shield about the translucent panel 42$^a$ and, further, to provide a sighting panel at the rear of the pointers 36, 37. A support for the block 11 includes a standard 43 rising from a foot-piece 44. A bracket 45, adjustable vertically on the standard 43, is clamped to said standard at the desired elevation by means of a set screw 46 threaded in the bracket 45 and binding against the standard 43. A lamp 47 is also adjustable vertically on the standard 43 through the medium of a lamp supporting and standard gripping clamp 48. The block 11 is seated on the bracket 45 and the lamp 47 adjusted on the standard 43 to locate the same directly behind the translucent panel 42$^a$ in the glass plate 42.

In operation, the bottle rest 14 is adjusted by manipulation of the knob 20 to suit the particular type of test-bottle used. That is to say, said rest is elevated or depressed as the condition may require to locate a given bottle so that the lowermost mark on the bottle scale will rest not lower than the lowermost position of the upper edge of the pointer 36. Once said rest is set for a given type of bottle its position need not be altered until a different bottle is used that requires a change. A test-bottle, containing a column of fat in the neck thereof, as produced in the process of testing, is seated on the rest 14. With the lamp 47 lighted, the direct rays therefrom are shielded from the user's eyes by the silvered glass plate 42, a uniform subdued light, however, being admitted through the translucent panel 42$^a$ to clearly illuminate the neck of the test bottle, the contents thereof and the graduations thereon, as well. The upper flat edge of the pointer 36 is brought to the level of the lower meniscus of the fat column by manipulation of the knob 29, this act being followed by the manipulation of the knob 34 to bring the lower flat side of the pointer 37 to the level of the upper edge of the meniscus at the top of the fat column. To insure exact eye level sightings, when the two pointers 36, 37, are set, the user sees that the flat sighting edge of the pointer being adjusted registers with the corresponding edge of the pointer reflection in the mirrored glass 42. With the pointers 36, 37 adjusted, the distance between the same representing the length of the fat column, the knob 29 is turned to bring the upper edge of the lower pointer 36 to the level of the zero mark on the bottle scale (dotted lines, Fig. 1). Sight is taken on the reflection of the lower pointer 36 in the glass 42, when said pointer is set on the zero mark of the scale, such sight then being taken on the reflection of the pointer 37, notation being made to the point of registration of the lower edge of said pointer with the bottle scale. Such point on said scale gives the desired reading in percentage by weight of fat in the tested sample.

The outstanding advantages resident in my improvement include the described facilities for uniformly illuminating a bottle neck from top to bottom thereof; the sighting feature, whereby exact eye level adjustments of the pointers may be made, and the ready facility for accurately leveling each pointer with its respective meniscus and for simultaneously setting the relatively adjusted pointers in respect to the scale of a test-bottle.

Changes in the specific form of my invention, as herein dsiclosed, may be made within the scope of what is claimed without departing from the spirit of my invention.

Having described my invention, what I claim as new and desire to protect by Letters Patent is:

1. In an instrument of the class described, a body, a bottle rest and a frame, both mounted on said body, a first upright rack-bar slidable vertically in said frame, a shaft journalled in said frame, a gear fixed on said shaft and meshing with the rack of said rack-bar, a pointer carried by the rack-bar at the upper tip thereof, a second upright rack-bar mounted on the first rack-bar so as to slide vertically thereon, a pointer at the upper tip of the second rack-bar, a shaft journalled in the first rack-bar, a gear fixed on said shaft meshing with the rack of said second rack-bar, a pair of gear turning knobs, one on each shaft, and separate means for resisting the rotation of said gears respectively, said pointers reaching horizontally into the proximity of the neck of a test bottle seated on said rest.

2. In an instrument of the class described, a support, a bottle rest and an upright frame, both mounted on said support, a first upright bar mounted to slide on the frame for vertical adjustment thereon, a pointer carried at the upper tip of said bar, a second upright bar mounted to slide on the first bar for vertical adjustment thereon, a pointer carried by said second bar at the upper tip thereof, said pointers being extended sideward of said bars into the proximity of the neck of a test bottle on said rest, individual means for holding said bars, respectively, in the various adjusted positions thereof, and means for adjusting said bottom rest vertically to locate a bottle in elevation, whereby the scale thereon will rest within the range of the pointer on said first bar.

3. In an instrument of the class described, a support, a bottle rest and an upright frame, both mounted on said support, a first upright bar slidably mounted on the frame for vertical adjustment thereon, a pointer carried by said bar at the upper tip thereof, a second upright bar slidably mounted on the first bar for vertical adjustment thereon, a pointer carried by said second bar at the upper tip thereof, said pointers being extended sideward of said bars into the proximity of the neck of a test bottle on said rest, and individual means for holding said bars, respectively, in the various adjusted positions thereof.

4. In an instrument of the present nature, supporting means, a bottle rest and calipering means mounted on said supporting means, said calipering means including horizontal pointers relatively and co-ordinately adjustable along the neck of a test bottle seated on said rest, a light shield mounted on said supporting means, a portion of said shield being translucent and forming the immediate background for the neck of the bottle, the remainder of said shield being opaque and a part thereof mirrored, said translucent portion of said shield providing for the uniform illumination of the neck of a test bottle and the mirrored portion furnishing reflections of said pointers, whereby a user may be guided in gaining true eye level sightings in the adjustment of the pointers in respect to a fat column in a test bottle and in respect to the scale on the bottle.

In testimony whereof, I have signed my name to this specification.

JULIUS HORTVET.